United States Patent

Dhainault

[11] Patent Number: 5,904,041
[45] Date of Patent: May 18, 1999

[54] FAIL SAFE THRUST REVERSER DOOR LOCK WITH A PLASTICALLY DEFORMABLE ELEMENT

[75] Inventor: Jean-Claude Patrice Dhainault, Betheny, France

[73] Assignee: Societe Hispano-Suiza Aerostructures, Gonfreville L'Orcher, France

[21] Appl. No.: 09/069,165

[22] Filed: Apr. 29, 1998

[30] Foreign Application Priority Data

Apr. 30, 1997 [FR] France ................................. 97 05339

[51] Int. Cl.⁶ ....................................................... F02K 3/02
[52] U.S. Cl. ...................... 60/226.2; 60/230; 244/110 B; 239/265.29
[58] Field of Search ................................. 60/226.2, 230; 244/110 B; 2390/265.27, 265.29, 265.31

[56] References Cited

U.S. PATENT DOCUMENTS

| 3,182,449 | 5/1965 | Kerney et al. | 60/35.6 |
| 4,484,439 | 11/1984 | Singer et al. | 60/230 |
| 4,970,857 | 11/1990 | Faupell | 60/254 |
| 5,448,884 | 9/1995 | Repp | 60/226.2 |

*Primary Examiner*—Timothy S. Thorpe
*Assistant Examiner*—Ted Kim

*Attorney, Agent, or Firm*—Bacon & Thomas, PLLC

[57] ABSTRACT

A fail safe emergency lock for a thrust reverser is disclosed in which the thrust reverser is located on a jet engine having a cowling bounding a gas flow duct, the cowling having at least one reverse thrust opening in communication with the gas flow duct. The thrust reverser has a thrust reverser panel movably mounted on the cowling so as to be movable between a forward thrust position, in which the thrust reverser panel covers the reverse thrust opening, and a reverse thrust position in which the reverse thrust opening is uncovered. The thrust reverser also includes an emergency lock to lock the thrust reverser panel near the forward thrust position in which the lock has a support fixedly attached to either the cowling or the thrust reverser panel, a strike plate slidably located on the support, a plastically deformable element located between the support (32) and the strike plate, (31) and a lock bolt (25, 25a) movably located on the other of the cowling and thrust reverser panel so as to be moveable between an unlocked position and a locked position in which the lock bolt engages the strike plate. The arrangement of the elements are such that movement of the thrust reverser panel relative to the cowling away from the forward thrust position causes relative movement between the strike plate (31) and the support, (32) thereby causing plastic deformation of the plastically deformable element (42, 42a) and preventing further movement of the thrust reverser panel toward the reverse thrust position.

9 Claims, 3 Drawing Sheets

FAIL SAFE THRUST REVERSER DOOR LOCK WITH A PLASTICALLY DEFORMABLE ELEMENT

BACKGROUND OF THE INVENTION

The present invention relates to a fail safe thrust reverser door lock that will hold a thrust reverser door of an aircraft jet engine close to its forward thrust position on the occasion of a malfunction in the primary door locking mechanism.

Thrust reversers for aircraft jet engines are, of course, well known in the art and typically such thrust reversers alter the normally rearward flowing propulsive gases into a direction having a reverse thrust component to decelerate the jet aircraft. Thrust reversers are usually incorporated into the cowling of the jet engine and comprise one or more movable panels that are movable between a forward trust position and a reverse thrust position. In their forward thrust positions, the panels cover one or more reverse thrust openings passing through the cowling, while such openings are uncovered when the panels are moved to their reverse thrust positions such that at least a portion of the propulsive gases are directed outwardly through the reverse thrust opening.

As can well be imagined, unintended deployment of the thrust reverser panel toward its reverse thrust position can be catastrophic during aircraft flight. Therefore, thrust reverser panel locking systems typically employ redundant locking mechanisms which may comprise a primary lock, a secondary lock and a tertiary lock. The functions of the secondary and tertiary locks are to hold the thrust reverser panel close to its forward thrust position upon malfunction of the primary lock. The secondary and tertiary door locks may be associated with the actuator for moving the panel between its forward thrust and reverse thrust positions, or may be located on different areas of the thrust reverser panel than the primary lock.

The secondary and tertiary, or emergency, locks must provide a substantial clearance, on the order of several mm, between a lock bolt and a strike plate in order that the engagement and disengagement of these elements does not hamper the operation of the thrust reverser panel, or the primary lock. Thus, on the occasion of an accidental malfunction of the primary lock, before the emergency lock becomes effective, the thrust reverser panel tends to move away from the forward thrust position until the clearance between the lock bolt and the strike plate of the emergency lock is taken up. This movement of the thrust reverser panel causes an impact between the lock bolt and the strike plate of the emergency lock with a release of kinetic energy proportional to the clearance "e". This impact applies additional stresses of at least twice the static stress $F_0$ to the emergency lock that it would have to withstand it if were operating without the clearance. To withstand these additional stresses, the thrust reverser structure must be reinforced in the vicinity of the stationary cowling, the movable thrust reverser panels and the locking components, thereby increasing the weight of the assembled thrust reverser and increasing the cost of manufacture and operation.

The problems caused by the additional stresses imposed upon the emergency lock are acute in regard to the pivoting door, or target-type thrust reverser wherein the thrust reverser panels comprise doors pivotally attached to the cowling such that a forward portion of the door pivots outwardly from the cowling in the reverse thrust position. In such thrust reversers, the doors are subjected to the pressure of the propulsive gases acting on the inner surface of the door which add substantially to the kinetic energy of the door upon malfunction of the primary lock. Also, once the door moves away from the forward thrust position, its forward portion is acted upon by the ambient airflow flowing over the external surfaces of the cowling which produces an additional force on the door tending to move it toward the reverse thrust position and consequently increasing the kinetic energy of the door until the clearance of the emergency lock is taken up.

The problem is also applicable in a cascade-type thrust reverser wherein the thrust reverser panel slides in a direction generally parallel to the longitudinal axis of the cowling from a forward, forward thrust position to a rearward reverse thrust position and to the "scoop" thrust reversers in which the panel comprises doors pivotally attached to the cowling in which the forward portions of the doors move radially inwardly into the gas flow duct when in the reverse thrust position.

SUMMARY OF THE INVENTION

A fail safe emergency lock for a thrust reverser is disclosed in which the thrust reverser is located on a jet engine having a cowling bounding a gas flow duct, the cowling having at least one reverse thrust opening in communication with the gas flow duct. The thrust reverser has a thrust reverser panel movably mounted on the cowling so as to be movable between a forward thrust position, in which the thrust reverser panel covers the reverse thrust opening, and a reverse thrust position in which the reverse thrust opening is uncovered. The thrust reverser also includes an emergency lock to lock the thrust reverser panel near the forward thrust position in which the lock has a support fixedly attached to either the cowling or the thrust reverser panel, a strike plate slidably located on the support, a plastically deformable element located between the support and the strike plate, and a lock bolt movably located on the other of the cowling and thrust reverser panel so as to be moveable between an unlocked position and a locked position in which the lock bolt engages the strike plate. The arrangement of the elements are such that movement of the thrust reverser panel relative to the cowling away from the forward thrust position causes relative movement between the strike plate and the support, thereby causing plastic deformation of the plastically deformable element and preventing further movement of the thrust reverser panel toward the reverse thrust position.

The present invention mounts a plastically deformable element between the stationary cowling structure, the emergency lock and the thrust reverser panel, whereby the plastically deformable element absorbs the kinetic energy of the thrust reverser panel without returning this energy to the thrust reverser panel. Such energy absorption reduces the stress applied to the cowling structure. Moreover, inherently, the plastic deformation of the plastically deformable element will be permanent, thereby rigidly immobilizing the thrust reverser panel in a position close to the forward thrust position such that the thrust reverser panel does not become a source of vibrations, which would occur if an elastically deformable element were utilized that would restore the energy applied to it by the thrust reverser panel.

The solution offered by the present invention has the advantage of simplicity and economy in implementation thereby enabling the thrust reverser assembly to be lightened and rendered less complex, since its structure does not need to withstand the additional stresses of the prior art thrust reverser locking systems. Also, the plastically deformable element may be removable such that, after it has been plastically deformed, it may simply be replaced during maintenance following such an occurrence.

The plastically deformable element must be sufficiently plastic to absorb the thrust reverser panel's kinetic energy without imparting a recoil to the thrust reverser panel, but should not be excessively plastic to prevent displacement of the thrust reverser panel beyond a desired position close the forward thrust position. Advantageously, the plastically deformable element comprises a honeycomb material that is stressed in a direction parallel to the axes of the honeycomb openings and may have a cylindrical configuration. The cylindrical element is oriented such that its axis is substantially parallel to a path of travel of the thrust reverser panel at the location of the lock as it moves away from its forward thrust position. During the deformation, such a structure presents a substantially constant reaction force F related to the absorbed energy W and to the length of deformation L defined by the equation:

$$W = F \times L.$$

For a given energy W, the variables F and L can be simultaneously minimized whereby the reaction force F is minimized to prevent the problem of the prior art devices, and the length of deformation L is minimized to permit a compact mechanism that is easily housed within the thickness of the cowling.

The plastically deformable element may be partially deformed in the axial direction prior to its assembly within the lock device in order to suppress the range of initial, slight deformations in which the cylindrical element reacts with a higher force which then significantly drops. Consequently, the plastically deformable element, when installed, will operate in a range in which it reacts to applied stresses with a more uniform force.

The use of a honeycomb material for the plastically deformable element offers several advantages. First, it is economical and simple to manufacture with the element merely being cut from a honeycomb panel. Secondly, it provides a regularity of deforming a force F with the walls bounding the hexagonal openings of the honeycomb structure supporting each other to thereby avoid any lateral deformation, and thirdly, it provides a large deformation at constant stress.

The sliding strike plate is mounted on a support extending in a direction substantially parallel to the path of travel of the thrust reverser panel in the vicinity of the support and compresses the plastically deformable element against the rigidly affixed support. The plastically deformable element may be retained in position between the strike plate and the support by a removable cover attached to the support. The cover should be easily removable to facilitate replacement of the deformed element following its compression.

The strike plate may also be T-shaped with the leg of the T sliding through the support and the plastically deformable element being interposed between the cross member of the T and a portion of the fixed support on either side of the leg of the T. This design also offers the advantage of great latitude in positioning the lock relative to the strike plate in which the opening receiving the lock bolt may be positioned at any point on the leg of the T. The present invention also makes it possible to reduce the additional force F imparted by the stresses caused by thrust reverser panel movement to the magnitude of the static force $F_0$.

DETAILED DESCRIPTION OF THE PREFERRED EMBODIMENT

Figure 1:
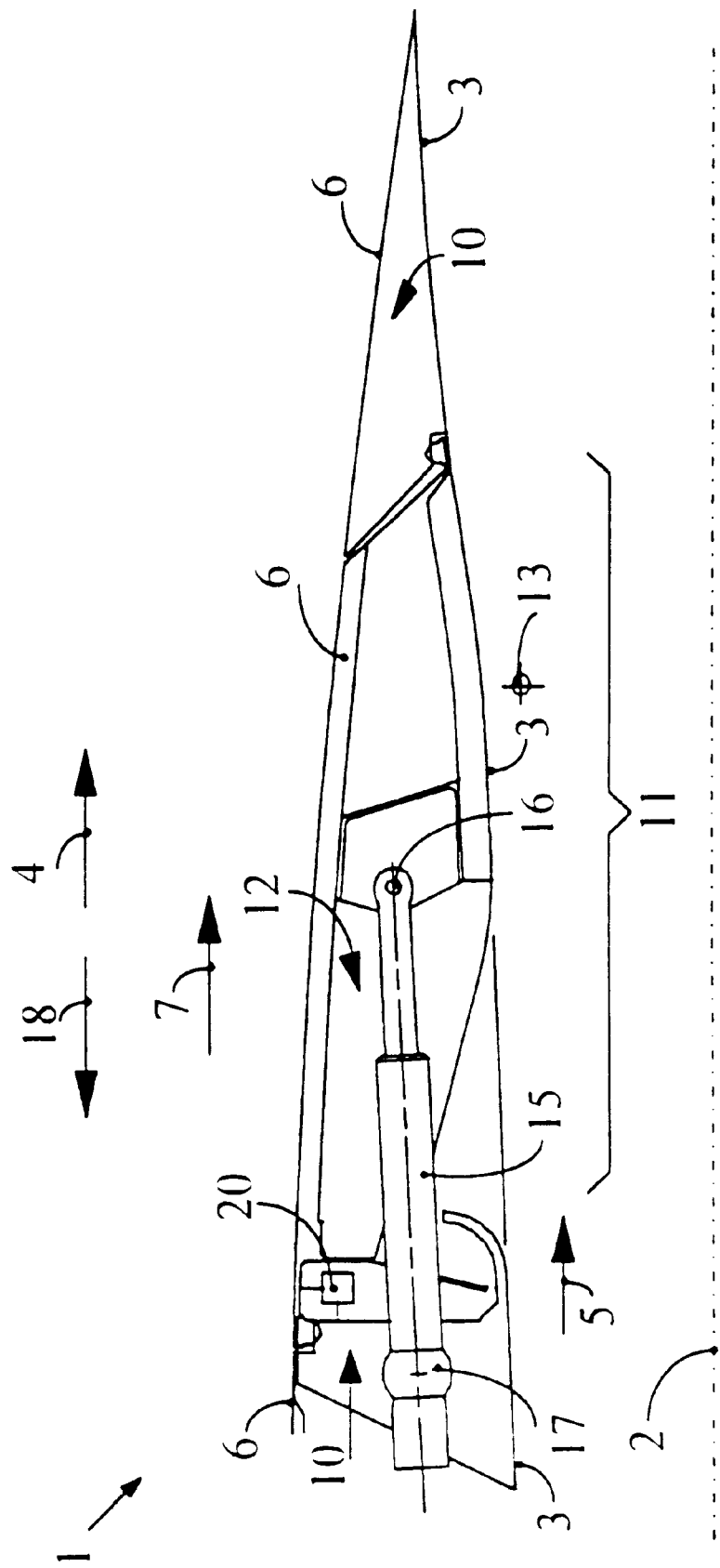
FIG. 1 is a partial, cross-sectional view of a thrust reverser according to the present invention.

As illustrated in FIG. 1, the cowling incorporating the thrust reverser comprises a substantially annular structure extending about longitudinal axis 2 and, encloses the turbojet engine (not shown). The cowling and thrust reverser have an inner wall 3 which forms an outer boundary for the propulsive gas flow duct through which the gases flow toward the rear, indicated by arrow 4, in the direction of arrow 5. The cowling and thrust reverser also have an outer wall 6 which forms an outer boundary of the cowling along which the ambient air flows in the direction of arrow 7.

A stationary structure 10 forms a portion of the cowling both forwardly (indicated by arrow 18) and rearwardly of a plurality of reverse thrust openings 11 which extend through the cowling. The reverse thrust openings 11 are covered by thrust reverser panels, which in this particular instance comprise thrust reverser doors 12 pivotally attached to the cowling so as to pivot about axis 13 on the stationary cowling structure 10. The thrust reverser door 12 is moved between its forward thrust position (illustrated in FIG. 1) and its reverse thrust position, in which the forward portion (towards the left as viewed in FIG. 1) is moved radially outwardly away from the cowling in a clockwise direction about axis 13 while a rear portion is moved inwardly into the propulsive gas flow duct such that at least a portion of the gases flowing through the duct are directed outwardly through the reverse thrust opening 11. The door is moved between the forward and reverse thrust positions by linear actuator 15 which is connected to the stationary structure by pivot 17 and which has an extendable and retractable rod that is pivotally attached to the thrust reverser door 12 at pivot 16.

When thrust reverser door 12 is in the forward thrust position, locking system 20 retains it in this position. Locking system 20 is interposed between the thrust reverser door 12 and the stationary cowling structure 10 and is typically, but not necessarily, located between the forward side of the thrust reverser door 12 and the adjacent portion of the cowling 10. As discussed previously, the locking system 20 may comprise a primary lock and at least one secondary, or emergency lock.

Figure 2:
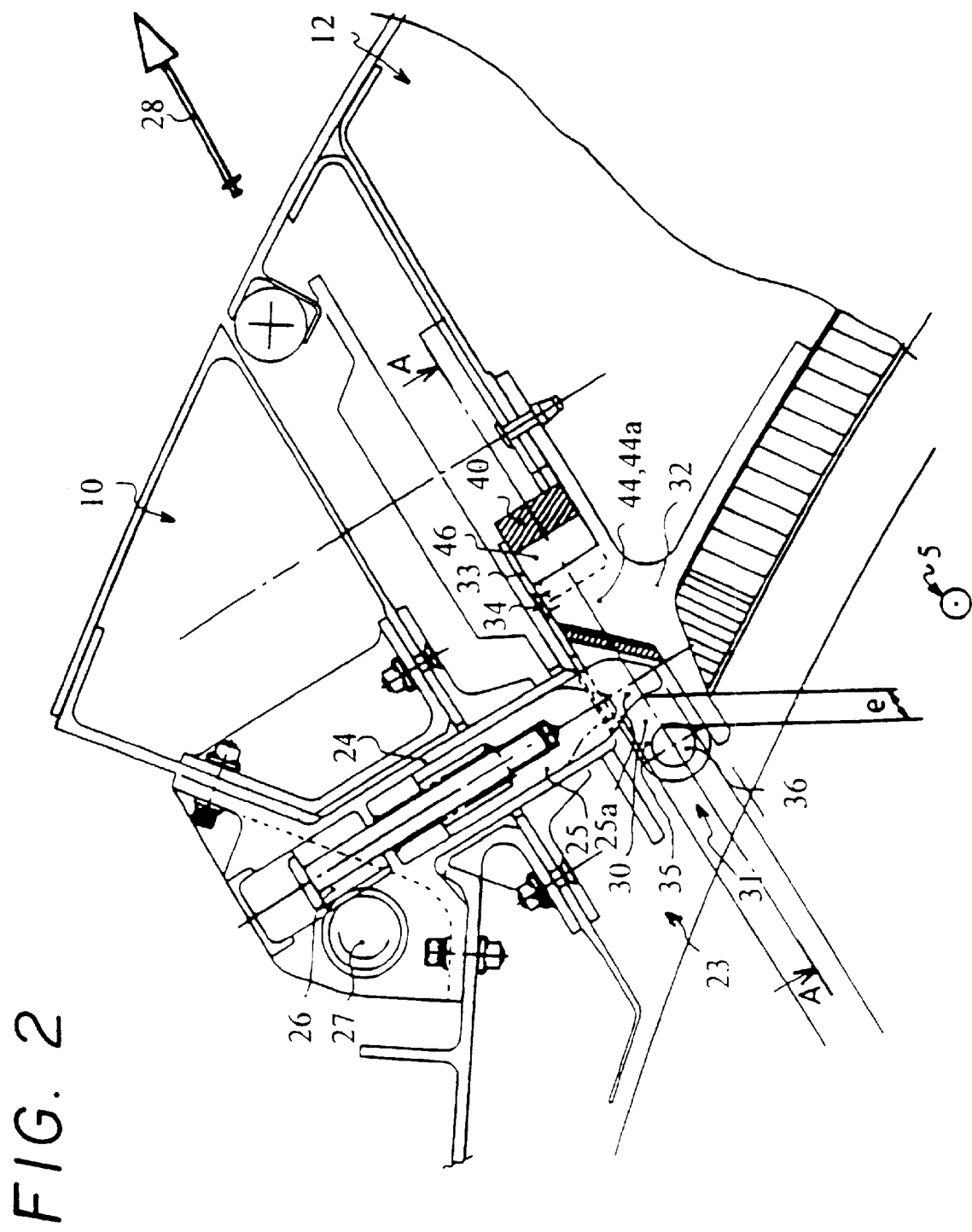
FIG. 2 is a partial, transverse cross-section of the lock device according to the present invention.

As best seen in FIG. 2, the emergency lock 23 comprises a cylindrical barrel 24 rigidly affixed to the stationary cowling structure 10 and a lock bolt 25 slidably mounted in the cylindrical barrel 24 and movable between locked and unlocked positions by a gear rack 26, affixed to the lock bolts 25, which is driven by rotatable pinion gear 27. The direction of movement of the forward portion of the thrust reverser door 12 toward the reverse thrust position is denoted by arrow 28 and the lock bolt 25 moves along an axis extending approximately perpendicular to the direction of arrow 28. A forward end 25a of the lock bolt 25 passes into an opening 30 in the strike plate 31 when the lock bolt 25 is in the locked position, the front end 25a being withdrawn from engagement with the strike plate 31 when the lock bolt is in the unlocked position. Strike plate 31 is slidably mounted on support 32 which, in this particular instance, is affixed to the thrust reverser door 12. It is to be understood that the positions of the support 32 and the cylindrical barrel 24 may be reversed without exceeding the scope of this invention. The strike plate 31 is at least partially covered by cover plate 33 which is removably affixed to the support 32 and which can be removed by unfastening screws 34. The strike plate 31 slides relative to the support 32 in a direction substantially parallel to the direction of motion of the thrust reverser door 12 indicated by arrow 28. In this particular construction, the opening 30 is bounded by a fork 35 of which the ends are mounted to a bar 36. In case of malfunction of the primary lock, the thrust reverer door 12 will move in the direction of arrow 28 thereby bringing the bar 36 into contact with the forward end 25a of the lock bolts 25, such contact preventing further opening of the thrust reverser door 12.

A clearance "e" exists between the bar 36 and the forward end 25a of latch bolt 25 when the thrust reverser door 12 is in its normal, forward thrust position. In case of malfunction of the primary lock system, the thrust reverser door 12 will move in the direction of arrow 28 due to the pressure exerted on its inner surface by the propulsive gas flow 5 to take up the clearance "e". During this movement of the thrust reverser door 12, it acquires substantial kinetic energy and exerts a large stress on the lock bolt 25 when the bar 36 comes into contact with the lock bolt. Additional stresses are imposed upon the remaining lock structure, as well as the stationary cowling structure 10 and the thrust reverser door structure 12.

Figure 3:
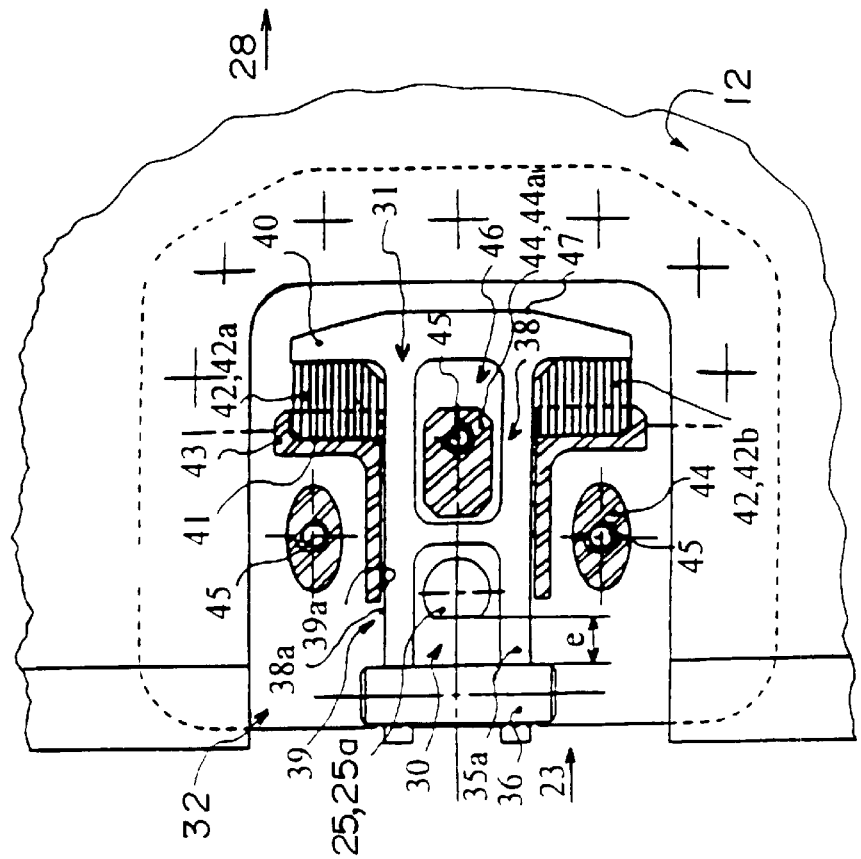
FIG. 3 is a top view of the lock according to the present invention viewed in a direction substantially perpendicular to the arrow 28 in FIG. 2, with the cover removed.

As best seen in FIG. 3, the strike plate 31 assumes a T-shape of which the leg 38 of the T slides in the direction of arrow 28 relative to the support 32. Opposites sides 38a of the leg 38 are located between opposite side walls 39a of a slide portion 39 of the support 32. An end of the leg 38 forms fork 35 having two arms 35a attached to the bar 36. The arms 35a and the bar 36 bound the opening 30 of the strike plate 31 which is engaged by the forward end 25a of the lock bolt 25. At its other end, the strike plate 31 has a cross member with arms 40 extending perpendicularly from either side of the T leg 38. Shoulders 41 extend from the slide portion 39 of the support 32 generally parallel to the arms 40 and a plastically deformable element 42 is located between each shoulder and each arm 40. The plastically deformable element 42 comprises honeycomb members 42a and 42b which extend substantially parallel to the direction of arrow 28. Each shoulder 41 has a flanged edge 43 which prevents the honeycomb members 42a and 42b from moving away from the leg 38 during deformation.

Figure 4:
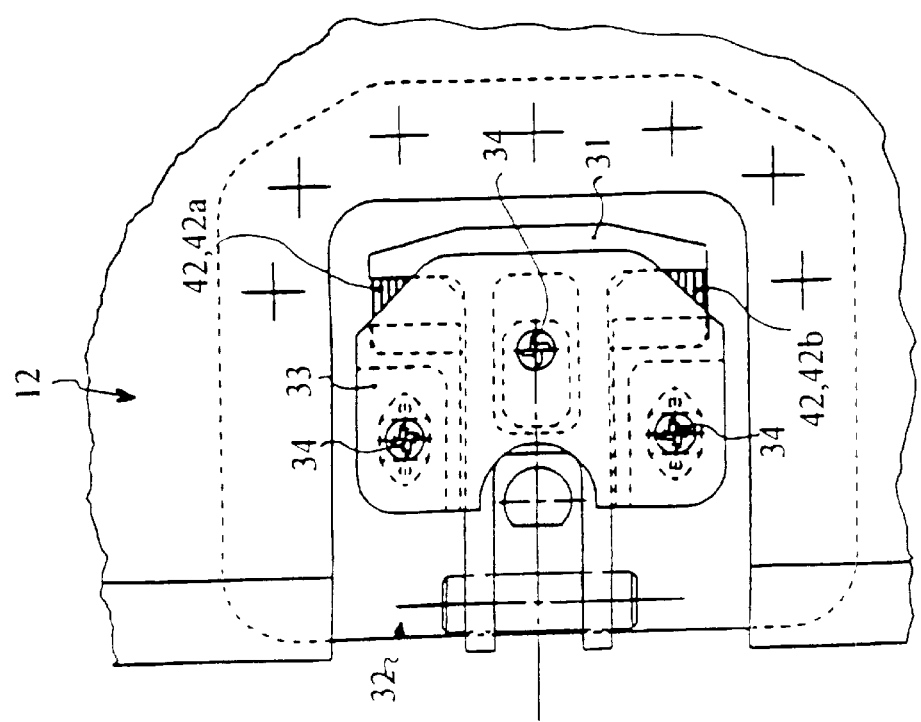
FIG. 4 is a view similar to FIG. 3 showing the lock according to the present invention with the cover installed.

Bosses 44 are located on the support 32, each boss having a threaded hole 45 into which screw 34 may be threaded to attach the cover 33 to the bosses 44. Preferably, one of the bosses 44a passes through an opening 46 in the T leg 38, or is located adjacent to the top 47 of the T to keep the arms 40 of the strike plate 31, just in contact with the honeycomb members 42a and 42b. FIG. 4 illustrates the cover 33 attached to the support 32 by screws 34, the cover 33 covering, at least in part, the T-shaped strike plate 31 and the honeycomb members 42a and 42b.

As can be seen in FIGS. 2 and 3, when the thrust reverser door 12 moves in the direction of arrow 28 due to a malfunction of the primary lock, the bar 36 of the strike plate 31 comes into contact with the front end 25a of the lock bolt 25. Such contact causes the strike plate 31 to slide relative to the support 32, such relatively sliding movement plastically crushing the honeycomb members 42a and 42b against the stationary shoulders 41. Cover 33 traps the honeycomb members 42a and 42b between the arms 40 and the shoulders 41 and additionally acts as a guide for the strike plate 31 against the support 32. Leg 38 has a generally rectangular cross-sectional configuration that is slidably guided between parallel walls 39a. The configurations of the various elements enable the assembly to be easily machined and facilitate the maintenance of the various elements.

As noted previously, the barrel 24 of the emergency lock 23 can be mounted on the thrust reverser door 12 and the strike plate, as well as the support 32 may be mounted on the stationary cowling structure 10. The plastically deformable element 42 may also directly constitute the linkage means of the strike plate 31, thereby eliminating the support 32.

The foregoing description is provided for illustrative purposes only and should be construed as in any way limiting this invention, the scope of which is defined solely by the appended claims.

I claim:

1. A fail safe thrust reverser for a jet engine having a cowling bounding a gas flow duct, the cowling having at least one reverse thrust opening therethrough in communication with the gas flow duct, the thrust reverser comprising:

a) at least one thrust reverser panel movably mounted on the cowling so as to be movable between a forward thrust position in which the at least one thrust reverser panel covers the at least one reverse thrust opening, and a reverse thrust position in which the at least one reverse thrust opening is uncovered; and b) a lock to prevent the at least one thrust reverse panel from moving to the reverse thrust position and comprising:

i) a support fixedly attached to one of the cowling and thrust reverser panel;

ii) a strike plate slidably located on the support;

iii) a plastically deformable element located between the support and the strike plate; and iv) a lock bolt movably located on the other of the cowling and thrust reverser panel so as to be movable between an unlocked position and a locked position in which the lock bolt engages the strike plate in which movement of the thrust reverser panel relative to the cowling away from the forward thrust position causes relative movement between the strike plate and the support thereby causing the plastic deformation of the plastically deformable element and preventing further movement of the thrust reverser panel toward the reverse thrust position.

2. The thrust reverser of claim 1, wherein the plastically deformable element is removably located between the strike plate and the support and is retained in place by a cover removably attached to the support.

3. The thrust reverser of claim 1, wherein the strike plate has a substantially T-shape comprising a leg and a cross member, the leg sliding in the support and the plastically deformable element located between the cross member and the support.

4. The thrust reverser of claim 1, wherein the plastically deformable element has a honeycomb structure.

5. The thrust reverser of claim 4, wherein the honeycomb structure has a plurality of honeycomb cells with longitudinal axes and is plastically deformable along said longitudinal axes.

6. The thrust reverser of claim 5, wherein the honeycomb structure is partially axially plastically deformed when the thrust reverser panel is in the forward thrust position.

7. The thrust reverser of claim 1, wherein the at least one thrust reverser panel is pivotally connected to the cowling.

8. The thrust reverser of claim 7, wherein the support is attached to the thrust reverser panel.

9. The thrust reverser of claim 8, wherein a portion of the thrust reverser panel to which the support is attached moves along a direction of movement as the thrust reverser panel moves away from the forward thrust position, and wherein the lock bolt is movable along a path substantially perpendicular to the direction of movement.

* * * * *

UNITED STATES PATENT AND TRADEMARK OFFICE
CERTIFICATE OF CORRECTION

PATENT NO. : 5,904,041
DATED : May 18, 1999
INVENTOR(S) : Jean-Claude Patrice Dhainault It is certified that error appears in the above-indentified patent and that said Letters Patent is hereby corrected as shown below:

Column 1, line 16, change "trust" to -- thrust --.

Column 6, line 14, change "should be" to -- should not be --.

Signed and Sealed this

Twenty-sixth Day of September, 2000

Attest:

Q. TODD DICKINSON

*Attesting Officer*

*Director of Patents and Trademarks*